United States Patent [19]
Tsuchimoto et al.

[11] Patent Number: 6,109,156
[45] Date of Patent: *Aug. 29, 2000

[54] PUNCHING APPARATUS AND PUNCH

[75] Inventors: Tomonori Tsuchimoto, Hashima-gun; Akimitsu Hiraki, Chita-gun; Yoshihiko Kurashima, Nagoya, all of Japan

[73] Assignee: NGK Insulators, Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/903,741

[22] Filed: Jul. 31, 1997

[30] Foreign Application Priority Data

Aug. 8, 1996 [JP] Japan .................................. 8-210153

[51] Int. Cl.⁷ ...................................................... B26F 1/14
[52] U.S. Cl. ........................... 83/660; 30/366; 83/698.91; 83/929
[58] Field of Search ............................... 408/103, 95, 97, 408/115 R, 199, 202, 227, 229, 234; 83/660, 929, 698.91; 30/366

[56] References Cited

U.S. PATENT DOCUMENTS

| | | | |
|---|---|---|---|
| 27,934 | 4/1860 | Steinmitz | 30/366 |
| 134,214 | 12/1872 | Mellor | 30/366 |
| 1,465,793 | 8/1923 | Schilling | 30/366 |
| 2,696,744 | 12/1954 | Severance | 408/103 |
| 3,022,686 | 2/1962 | Rowley | 408/95 |
| 4,032,251 | 6/1977 | Ribich | 408/199 |
| 4,039,266 | 8/1977 | O'Connell | 408/202 |
| 4,189,266 | 2/1980 | Koslow | 408/224 |
| 4,225,275 | 9/1980 | Elliott | 408/229 |
| 4,521,145 | 6/1985 | Beiler | 408/218 |
| 4,705,436 | 11/1987 | Robertson | 408/72 R |
| 4,891,887 | 1/1990 | Witte | 408/228 |
| 5,116,353 | 5/1992 | Green | 606/184 |
| 5,149,234 | 9/1992 | Durfee, Jr. | 408/211 |
| 5,486,190 | 1/1996 | Green | 30/366 |
| 5,570,978 | 11/1996 | Rees et al. | 408/144 |
| 5,587,252 | 12/1996 | Tsuchimoto et al. | 429/49 |
| 5,617,619 | 4/1997 | Knudson | 30/366 |

FOREIGN PATENT DOCUMENTS

| | | |
|---|---|---|
| 6-196209 | 7/1994 | Japan . |
| 6-333606 | 12/1994 | Japan . |
| 8-37039 | 2/1996 | Japan . |

*Primary Examiner*—Steven C. Bishop
*Attorney, Agent, or Firm*—Parkhurst & Wendel, L.L.P.

[57] ABSTRACT

A drilling jig has a pyramidal tip, a cylindrical portion, and a proximal end. The pyramidal tip is formed like a polygonal pyramid and each pyramidal face is provided with a concave. The cylindrical portion connecting with the pyramidal tip is formed like a prism and the proximal end is made of a flat plate functioning as a stopper. The drilling jig makes it possible to efficiently recover sodium from a spent NaS cell without greatly damaging the structure of the cell.

4 Claims, 3 Drawing Sheets

PUNCHING APPARATUS AND PUNCH

BACKGROUND OF THE INVENTION AND RELATED ART STATEMENT

The present invention relates to a punching apparatus and a punch which can be preferably used to punch, for example, a spent sodium-sulfur cell (NaS cell).

An NaS cell is made by filling the inside of a β-alumina solid electrolyte tube with molten metallic sodium and the outside of the tube with molten sulfur and sealing the whole in a metallic vessel. Because the NaS cell has a capacity capable of storing a lot of electric power for long time periods, it is popular as an electric power storage cell. Therefore, the NaS cell has been increasingly manufactured and used in large quantities. It is assumed that the service life of the NaS cell is approximately 10 years and therefore, it is estimated that many of the presently produced NaS cells will become spent and require disposal.

Therefore, the inventor has developed the recycling of a spent NaS cell by disassembly and recovery by useful substances such as sodium and sulfur and various proposals have been offered so far (see Japanese Patent Application Laid-Open Nos. 6-196209 and 6-333606).

SUMMARY OF THE INVENTION

The inventor of the present invention has earnestly performed various studies in order to develop a punching apparatus and a punch to be used preferably to recover sodium from a spent NaS cell. As a result, the inventor finds that a punch of the present invention basically comprising the so-called push-top-type structure can efficiently recover sodium from a spent NaS cell without greatly damaging the structure of the cell.

That is, the present invention provides a punch comprising a pyramidal tip, a cylindrical portion, and a proximal end;

(a) the pyramidal tip being formed like a polygonal pyramid and a concave being formed on each pyramidal face, and (b) the cylindrical portion connected to the pyramidal tip being formed like a prism.

In the case of a punch of the present invention, it is preferable that the proximal end is made of a flat plate functioning as a stopper and moreover, the pyramidal tip is formed like a quadrangular pyramid and the cylindrical portion is like a taper.

Moreover, the present invention provides a punching apparatus comprising a guide for holding an NaS cell set in a vessel, an NaS cell end face holder set on the vessel, and a drive holding the punch.

BRIEF DESCRIPTION OF THE DRAWINGS

FIGS. 1(a) to 1(c) show one embodiment of a punch of the present invention, in which FIG. 1(a) is a front view of the punch, FIG. 1(b) is a sectional view of the punch in FIG. 1(a), taken along the line A—A in FIG. 1(a), and FIG. 1(c) is a sectional view of the punch in FIG. 1(a), taken along the line B—B in FIG. 1(a).

PREFERRED EMBODIMENTS OF THE INVENTION

Figure 1A:
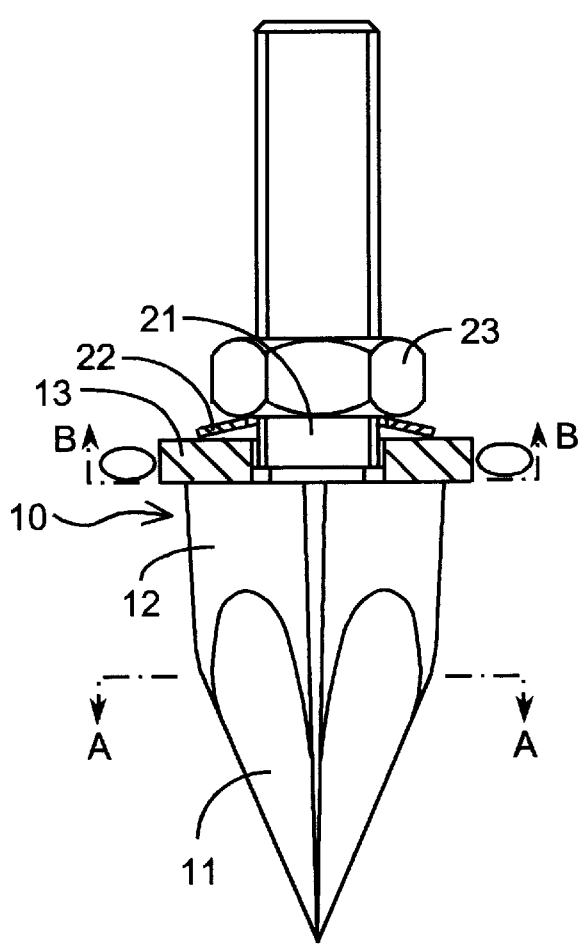

A punch of the present invention comprises a pyramidal tip, a cylindrical portion, and a proximal end.

A punch of the present invention makes it possible to punch an Al plate constituting the outermost wall of the cathode of an NaS cell with a small working force by forming a pyramidal tip like a polygonal pyramid. Moreover, according to the test results by the present inventor et al., it is confirmed to be able to punch an Al plate with a working force of approximately 150 to 300 kg or less.

Moreover, a concave provided for each pyramidal face of a pyramidal tip has a function for dispersing and enlarging an Al plate and an SUS plate constituting the inner wall of an NaS cell in various directions, that is, dispersing and enlarging a quadrangular pyramid in four directions and is used to concentrate a working force on corners of the pyramidal tip. This structure further improves the effect for breaking (punching) the outer wall of an NaS cell. The pyramid of a pyramidal tip can use not only the above quadrangular pyramid but also a polygonal pyramid such as a pentagonal prism or hexagonal prism. However, a quadrangular prism is most preferable from the viewpoints of the degree of concentration of a working force on corners and the drilling effect.

Furthermore, a structure ranging from a pyramidal tip to a cylindrical portion to a cylindrical proximal end has an effect for folding an Al plate or SUS plate drilled by the structure and also an effect for enfolding the cut portion into the inside of an NaS cell so that it does not protrude to the outside of the cell.

It is preferable to taper the cylindrical portion so that the diameter slightly increases from a proximal end toward a pyramidal tip. The tapered cylindrical portion has a function for preventing the spring-back of the Al plate or SUS plate punched by the pyramidal tip and securing the Al or SUS plate and a function for decreasing the force for extracting a punch from an NaS cell after punching the cell.

The proximal end of a punch is made of a flat plate in order to prevent the internal structure of an NaS cell to be damaged so that the drilling jig does not enter the NaS cell by exceeding a predetermined position of the NaS cell as a stopper. Moreover, by using a pressure sensor, it is possible to fetch a punch completion signal or a signal for the next step operation.

From the test results by the present inventor et al., it is confirmed that a punch of the present invention having the above structure can drill the outer wall of an NaS cell with a working force of approximately 1,100 to 1,800 kg as a force necessary for punch the outer wall of an NaS cell.

Moreover, by punch an NaS cell in oil, it is confirmed that less resistance for punch the outer wall of an NaS cell is required and the above punch force of 1,800 kg is decreased to approximately 1,400 kg.

The material of a punch jig of the present invention is properly selected out of materials whose strength and abrasion loss are superior to materials constituting an object to be drilled. Specifically, including carbon steel such as S45C and abrasion-resistant materials such as SKH are used.

Moreover, when using a spent NaS cell as an object to be punched, it is preferable to use a material congenial with Al, that is, a material not reacting on Al at a high temperature because a lot of Al plates are used to form the wall of the NaS cell.

The present invention is described below by referring to the embodiments shown in the accompanying drawings. However, the present invention is not restricted to these embodiments.

Figure 1B:
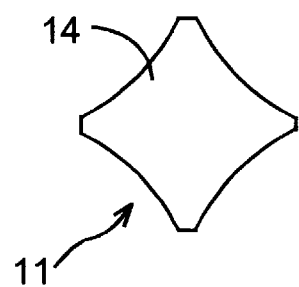
Figure 1C:
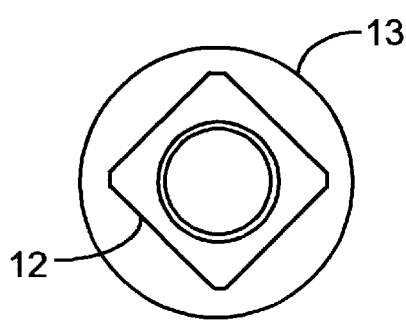

FIGS. 1(a) to 1(c) show one embodiment of a punch of the present invention, in which FIG. 1(a) is a front view of the punch in FIG. 1(a), FIG. 1(b) is a sectional view of the punch in FIG. 1(a), taken along the line A—A in FIG. 1(a), and FIG. 1(c) is a sectional view of the punch in FIG. 1(a), taken along the line B—B in FIG. 1(a).

In FIGS. 1(a) to 1(c), symbol 10 denotes a punch, 11 denotes a pyramidal tip of the punch, 12 denotes a cylindrical portion, and 13 denotes a cylindrical proximal end. The pyramidal tip 11 is a quadrangular pyramid and each pyramidal face 14 of the tip is concavely formed.

The pyramidal tip 11 connects with the cylindrical portion 12 and the cylindrical portion 12 is slightly tapered. Moreover, the cylindrical portion 12 connects with the cylindrical proximal end 13 and thereby, the punch 10 is constituted.

Figure 2:
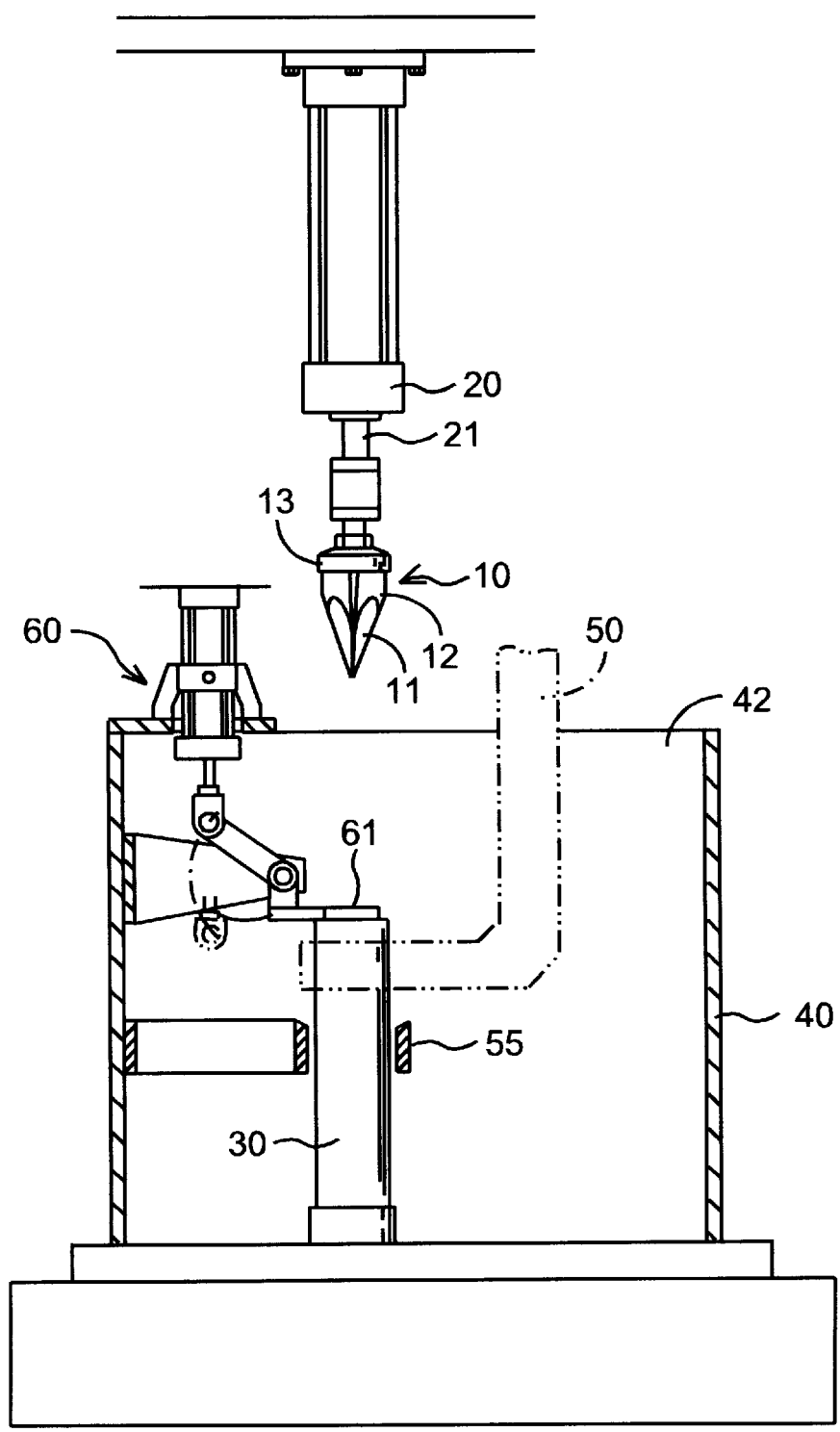
FIG. 2 is an illustration showing one embodiment of a drill to which a drilling jig is set.
Figure 3:
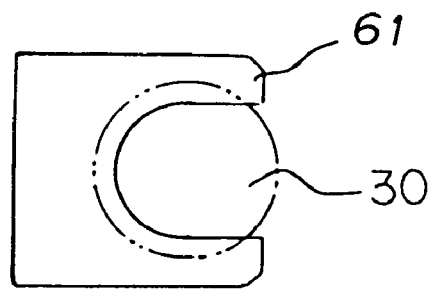
FIG. 3 is an illustration showing one embodiment of a horseshoe-type head holder of a head holding air cylinder.

The front end 21 of a hydraulic cylinder 20 is screwed into the rear end of the cylindrical end 13 as shown in FIG. 2 so that the punch 10 can move downward in FIGS. 1(a) to 1(c) and FIG. 2. Symbol 22 denotes a spring washer which firmly screws the proximal end 13 and the front end 21 of the hydraulic cylinder 20 together with a nut 23.

Moreover, as shown in FIGS. 1(a), 1(b), and 1(c), because corners of the pyramidal tip 11 has a width, melted sodium which finally remains is easily ejected.

FIG. 2 is an illustration showing one embodiment of a drill to which a punch is set, in which the punch 10 is screwed to the front end 21 of the hydraulic cylinder 20 serving as a drive. The drill is provided with the hydraulic cylinder 20 to which the punch 10 is screwed and a head-holding air cylinder 60 for holding down and fixing the head of an NaS cell 30.

The NaS cell 30 is vertically set in an oil vessel 40 for storing oil 42 and inserted into a guide cylinder 55 in the oil vessel 40 while the sides of the NaS cell 30 is held by the arm 50 of a robot and moreover, the head of the NaS cell 30 is held and fixed by the horse-shoe-type head holder 61 of the head holding cylinder 60.

Thus, the NaS cell 30 is held and fixed in the oil vessel 40 and thereafter, the punch 10 is moved downward by the hydraulic cylinder 20 to drill the head of the NaS cell 30 at a predetermined pressure.

After the head is punched, the punch 10 is lifted upward, the NaS cell 30 whose head is drilled is moved into a heating vessel (not-illustrated) so that the opening of the head is turned downward, and sodium is melted and drained.

A spent NaS cell is described above as an example of an object to be punched. However, a drilling jig of the present invention is not applied only to the spent NaS cell. It is needless to say that the punch can be also applied to other objects to be punched.

As described above, a punch of the present invention makes it possible to punch an object to be punched without generating chips such as a spent NaS cell with a small working force and efficiently and easily recover and recycle a useful substance such as sodium. Therefore, the punched can be used as a simple piece of equipment superior in maintainability.

What is claimed is:

1. A punch having a tapered portion comprising:

a pyramidal tip, a cylindrical portion, and a cylindrical proximal end;

said pyramidal tip being a polygonal pyramid, being longer than said cylindrical portion, having corners at each connected portion of respective two adjacent surfaces of said pyramidal tip, having a width sufficient to form a punched shape from which melted sodium can be easily removed, and each pyramidal face being concave; and said cylindrical portion having an upper portion being larger in the diameter than a lower portion so as to prevent the spring-back of a plated NaS cell and reduce a force required to extract the tip portion from the cell after punching the cell, having corners being extended from corners of said pyramid tip and having a gradually broadened width towards said cylindrical proximal end so as to make sure formation of said punched shape in such a manner that the opening formed has broadened portions at the respective corners, whereby the removal of melted sodium is able to be achieved easily; and comprising an upper end and a lower end, said lower end being directly connected to said pyramidal tip, said upper end being directly connected to said cylindrical proximal end, and only said lower end of said cylindrical portion being tapered wherein said cylindrical proximal end comprises a threaded rear portion for receiving a front end of a hydraulic cylinder.

2. The punch according to claim 1, wherein said cylindrical proximal end is made of a flat plate functioning as a stopper.

3. The punch according to claim 1, wherein said pyramidal tip is a quadrangular pyramid.

4. A punching apparatus comprising:

a guide for holding an NaS cell set in a vessel;

an NaS cell end face holder provided on said vessel;

a drive having a punch having a tapered portion comprising a pyramidal tip, a cylindrical portion, and a cylindrical proximal end; said pyramidal tip being a polygonal pyramid, being longer than said cylindrical portion, having corners at each connected portion of respective two adjacent surfaces of pyramidal tip having a width sufficient to form a punched shape from which melted sodium can be easily removed, and each pyramidal face being concave;

said tapered cylindrical portion having an upper portion being larger in the diameter than a lower portion so as to prevent the spring-back of a plated NaS cell and reduce a force required to extract the tip portion from the cell after punching the cell, having corners being extended from corners of said pyramid tip and having a gradually broadened width towards said cylindrical proximal end so as to make sure formation of said punched shape in such a manner that the opening formed has broadened portions at the respective corners, whereby the removal of melted sodium is able to be achieved easily;

comprising an upper and a lower end, said lower end being directly connected to said pyramidal tip, said upper end being directly connected to said cylindrical proximal end, and only said lower end of said cylindrical portion being tapered; and said upper portion of the cylindrical portion being connected directly to said cylindrical proximal end at an end, and the lower portion being connected directly to said pyramidal tip at an end wherein said cylindrical proximal end comprises a threaded rear portion for receiving a front end of a hydraulic cylinder.

* * * * *